Feb. 25, 1958     A. B. TAYLOR     2,824,913
HANGER FOR ELECTRICAL TROLLEY
Filed Jan. 5, 1954
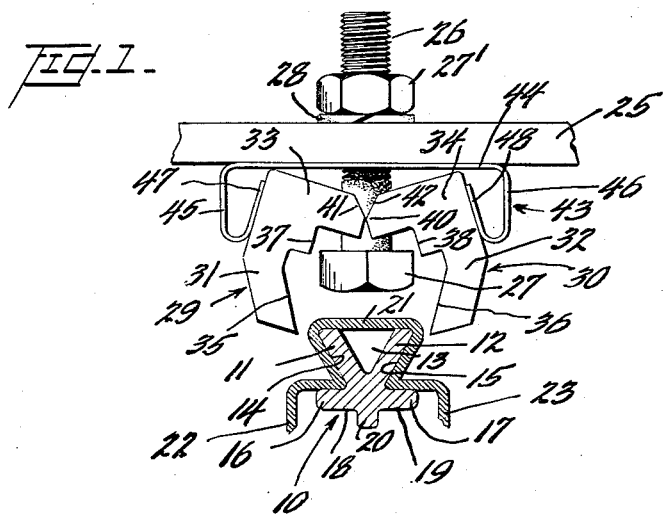
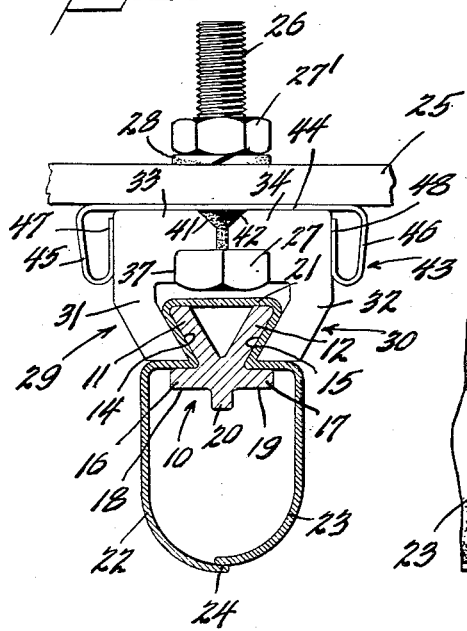
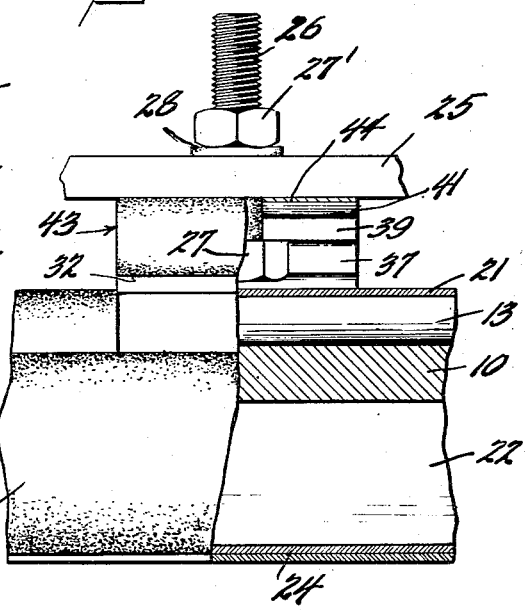
INVENTOR:
Ashton B. Taylor
BY
Smith, Michael & Gardiner
ATTORNEYS United States Patent Office 2,824,913
Patented Feb. 25, 1958

2,824,913

HANGER FOR ELECTRICAL TROLLEY

Ashton B. Taylor, Pittsburgh, Pa.

Application January 5, 1954, Serial No. 402,205

1 Claim. (Cl. 191—43)

This invention relates to hangers for electrical trolleys and more particularly to hangers which are used to support relatively stiff bus bars which form the trolley and with which a collector shoe cooperates.

In trolley systems to which the present invention is directed, the overhead trolley consists of relatively rigid bus bars, the bars are in sections arranged in end-to-end relationship to form a track of the desired length, and it is essential that these sections be rigidly supported in alignment at various points throughout the length of the trolley.

It is also desirable that the hangers for such bus bar sections be of simple construction which may be quickly and easily installed by unskilled labor in order to reduce installation costs.

Likewise, it is advantageous to provide such hangers which consist of a minimum number of parts to facilitate assembly, and which are so designed that they can be installed only in proper relation to the bus bar, thereby eliminating loss of time in fitting the parts in proper position.

An object of the present invention is, therefore, to provide a hanger which will rigidly support sections of bus bar constituting the trolley track in alignment with each other.

Another object is to provide a hanger comprising a minimum number of parts which can only be installed in proper relation to the bus bar sections and which, by its simplicity, may be cheaply manufactured and easily and quickly installed.

A further object is to provide a hanger comprising clamp members which engage opposite sides of the bus bar sections, the members being of identical shape, so as to reduce manufacturing costs, together with means for properly centering said clamping members relative to the bus bar sections.

Other objects and advantages will be readily apparent as the description proceeds, it being understood that the illustrated embodiment is of the preferred form but that changes and modifications may be resorted to so long as they fall within the spirit and scope of the appended claim.

Referring to the drawings, forming part hereof, and in which like numerals designate like parts throughout the views, Fig. 1 is an end elevation of the hanger at the beginning of the installation operation, the cooperating bus bar and its shield being shown in section, Fig. 2 is a view similar to Fig. 1, but with the hanger completely installed and supporting the bus bar, and Fig. 3 is a fragmentary, side elevation of Fig. 2, parts thereof being broken away more clearly to illustrate the construction.

In the drawing, the electrical bus bar 10 is shaped as shown in section in Figs. 1 and 2 and consists of converging arms 11 and 12 forming a V-shaped trough 13 therebetween for cooperation with conductor blocks forming parts of an expansion joint as shown and described in my application Serial No. 396,924, filed December 8, 1953. However, the trough 13 is not essential in the present construction, so long as the bus bar is provided with converging surfaces 14 and 15 at opposite sides thereof.

Extending horizontally on opposite sides of the bus bar are wings 16 and 17 at the point of convergence of the surfaces 14 and 15 to form collector shoe contacting faces 18 and 19, and the bus bar is further provided with a rib 20 projecting beyond the plane of the faces 18 and 19 intermediate the wings 16 and 17 as shown in the aforesaid application.

An insulating shield 21 encloses the bus bar sections throughout the length of the trolley track and is provided with flexible extensions 22 and 23 which overlap at 24 to form an enclosure for a collector shoe, the extensions spreading apart as the shoe travels along the track, as is well understood. The upper portion of the shield 21 is shaped to conform to the diverging surfaces 14 and 15 and to the upper faces of the wings 16 and 17, so that the hanger used to support the bus bar will likewise clamp the shield to the bus bar.

The bus bar sections 10 are supported from any suitable support such as 25 provided with an opening therethrough for the reception of a bolt 26 provided with an enlarged head 27 at its lower end. The threaded shank of the bolt projects through the support 25 and is supported thereby by means of nut 27' threaded on the shank and bearing on a spring washer 28 engaging the upper face of the support, so that as the nut 27' is turned the head 27 of the bolt is moved toward or away from the support 25.

Engaging the bus bar sections 10 on opposite sides thereof are insulating clamps 29 and 30 which are shown as being substantially L-shaped in cross section and comprise leg portions 31 and 32 and toe portions 33 and 34.

The leg portions 31 and 32 are provided with inner faces 35 and 36 which converge toward each other when fully assembled and mate with the converging surfaces 14 and 15 on the bus bar and the toe portions are provided on their inner surfaces with cut away portions 37 and 38 which, when the hanger is completely installed, cooperate to form a socket therebetween for the reception of the bolt head 27 as shown in Fig. 2.

The walls of the cut away portions 37 and 38 snugly embrace the bolt head 27 and are so formed that they engage said head and prevent its turning relative to the clamps 29 and 30 as the nut 27' is operated.

The toe portions are likewise provided with semi-circular recesses, one of which is shown at 39 in Fig. 3 so that the toe portions encircle the shank of the bolt 26 and engage each other as at 40.

The outer faces of the toe portions are oppositely bevelled at 41 and 42 to facilitate assembly, as will clearly appear as the operation of installation is described.

As seen in Figs. 1 and 2 the toe portions 33 and 34 lie between the support 25 and the head 27 of the bolt 26, and when the hanger is fully installed, the toe portions are rigidly clamped between the bolt head and support, with the leg portions 29 and 30 rigidly clamping the bus bar and shield in position.

Interposed between the support 25 and the clamps 29 and 30 is a spring-retaining clip 43 comprising a web 44 having an opening therein through which the bolt 26 passes and having at its opposite ends depending spring arms 45 and 46 provided with return bends forming legs 47 and 48 which bear against the outer faces of the clamps 29 and 30.

As seen in Fig. 1, the legs 47 and 48 converge toward each other and diverge from the arms 45 and 46. However, as the bolt head is moved into clamping position as seen in Fig. 2, the resilient legs 47 and 48 are forced toward the arms 45 and 46 so that they are placed under compression, and the clamps 29 and 30 are retained in proper position.

At the beginning of the installation operation, the parts are as seen in Fig. 1, wherein the leg portions of the clamps 29 and 30 are spread apart for the reception of the bus bar therebetween and with the toe portions 33 and 34 lying between the bolt head 27 and the support 25. The bevels 41 and 42 permit insertion of the clamps as shown with their ends engaging at 40 to form fulcrum points and with the spring legs 47 and 48 in their expanded condition engaging the clamps.

As the bolt head moves to clamping position, it engages the toe portions of the clamps and rocks them about the fulcrum point 40 until they engage the support 25. At the same time, the leg portions 31 and 32 are swung toward each other and, with the bus bar therebetween, the bus bar is firmly clamped between the legs of the clamps. When the clamps 29 and 30 rock about the point 40, it is obvious that the upper portions of the legs 31 and 32 are moved against the expanding force of the spring legs 47 and 48 to compress the same, thereby centering the clamping members and retaining the same in position.

From the foregoing, it is apparent that the present invention provides a simple, inexpensive, and readily installed hanger for bus bar trolley systems. It is composed of few parts which are so designed that they must be installed in proper relation and when so installed have long life, practically no need for maintainance, and result in an economical electrical trolley system.

I claim:

A hanger for bus bars comprising a bus bar, a support, a pair of inverted L-shaped clamps one engaging each side of said bus bar, said clamps comprising opposed toe portions lying between the bus bar and support and leg portions extending along the sides of the bus bar, an operating member for clamping the toe portions against said support and forcing the leg portions against the opposite faces of the bus bar, said operating member passing between said toe portions, and a spring clip lying between said clamps and the support, said clip having projecting resilient arms at opposite ends provided with return bends providing converging resilient legs engaging the outer faces of said clamping members, said legs being under compression when the clamps engage the support.

References Cited in the file of this patent
UNITED STATES PATENTS

| | | |
|---|---|---|
| 888,498 | Henrikson | May 26, 1908 |
| 931,400 | Dusinberre | Aug. 17, 1909 |
| 934,562 | McCallum | Sept. 21, 1909 |
| 1,248,728 | Scott | Dec. 4, 1917 |
| 1,408,048 | Wahlberg | Feb. 28, 1922 |
| 1,461,812 | Wood | July 17, 1923 |
| 2,070,883 | Cawood et al. | Feb. 16, 1937 |
| 2,541,206 | Christophersen | Feb. 13, 1951 |
| 2,661,649 | Skinner | Dec. 8, 1953 |
| 2,668,199 | Connell | Feb. 2, 1954 |